United States Patent [19]
West

[11] Patent Number: 5,052,065
[45] Date of Patent: Oct. 1, 1991

[54] IMPACT CUSHIONING DEVICE FOR BED OR WHEELCHAIR

[76] Inventor: Raymond O. West, P.O. Box 1137, Belfair, Wash. 98528

[21] Appl. No.: 638,542

[22] Filed: Jan. 8, 1991

[51] Int. Cl.[5] ........................ A47C 27/08; B60R 21/16
[52] U.S. Cl. ........................................... 5/424; 5/453; 182/137; 280/304.1; 280/730; 280/736; 297/216; 297/DIG. 4
[58] Field of Search .................... 5/424, 508, 507, 420, 5/449, 453; 297/DIG. 4, 216; 280/730, 736, 304.1; 182/137

[56] References Cited

U.S. PATENT DOCUMENTS

| | | | |
|---|---|---|---|
| 1,985,432 | 12/1934 | Tucker et al. | 5/348 |
| 2,975,855 | 3/1961 | Dudek | 182/137 |
| 3,642,303 | 2/1972 | Irish et al. | 280/730 |
| 3,840,922 | 10/1974 | Morrison et al. | 5/350 |
| 3,851,730 | 12/1974 | Scurlock | 182/137 |
| 4,153,958 | 5/1979 | Paulik | 5/453 |
| 4,169,295 | 10/1979 | Darling | 5/453 |
| 4,788,726 | 12/1988 | Rafalko | 5/93.1 |
| 4,803,744 | 2/1989 | Peck et al. | 5/453 |
| 4,834,420 | 5/1984 | Sankrithi et al. | 280/730 |
| 4,875,548 | 10/1989 | Lorsbach | 182/137 |

*Primary Examiner*—Alexander Grosz
*Attorney, Agent, or Firm*—Stetina and Brunda

[57] ABSTRACT

This invention relates to an impact cushioning device for protecting wheelchair or hospital bed occupants from fall-related injuries. The cushioning device generally comprises an inflatable air cushion which is supported by the wheelchair or hospital bed and adapted to inflate when the occupant is removed from the wheelchair or bed. The air cushion is oriented on the wheelchair or bed in a manner wherein the cushion creates a barrier between the wheelchair or bed occupant and the floor when inflated.

22 Claims, 1 Drawing Sheet

Fig. 1
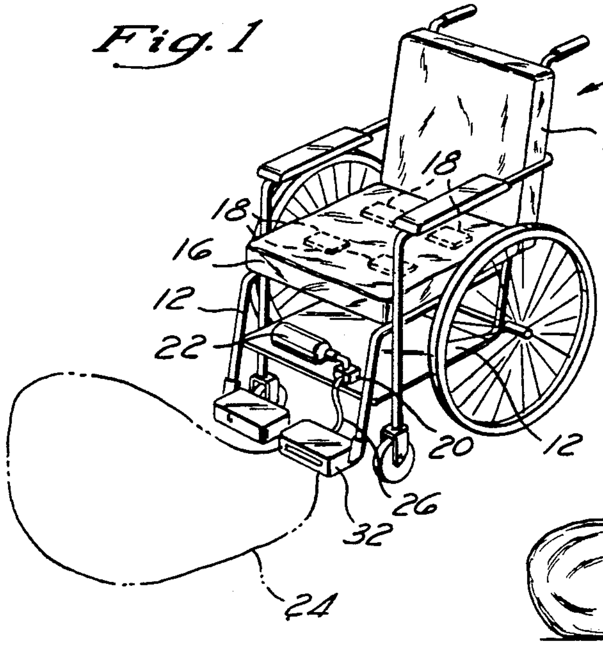
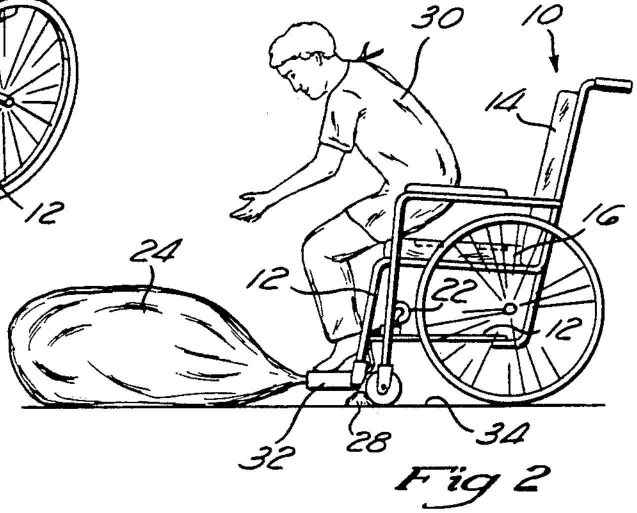
Fig 2
Fig. 3
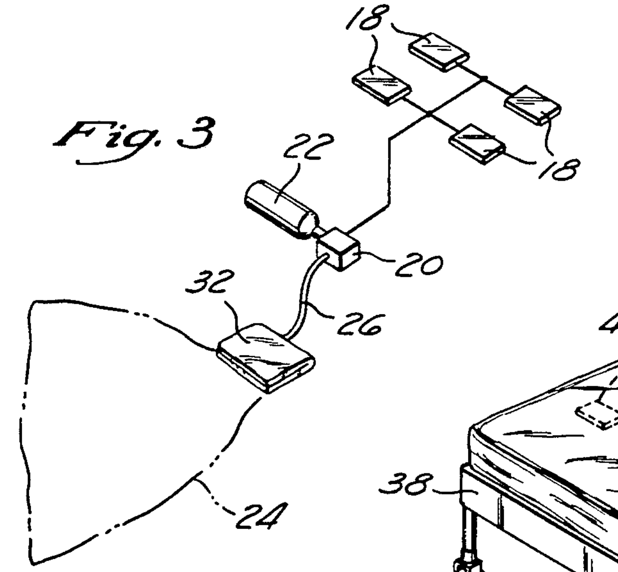
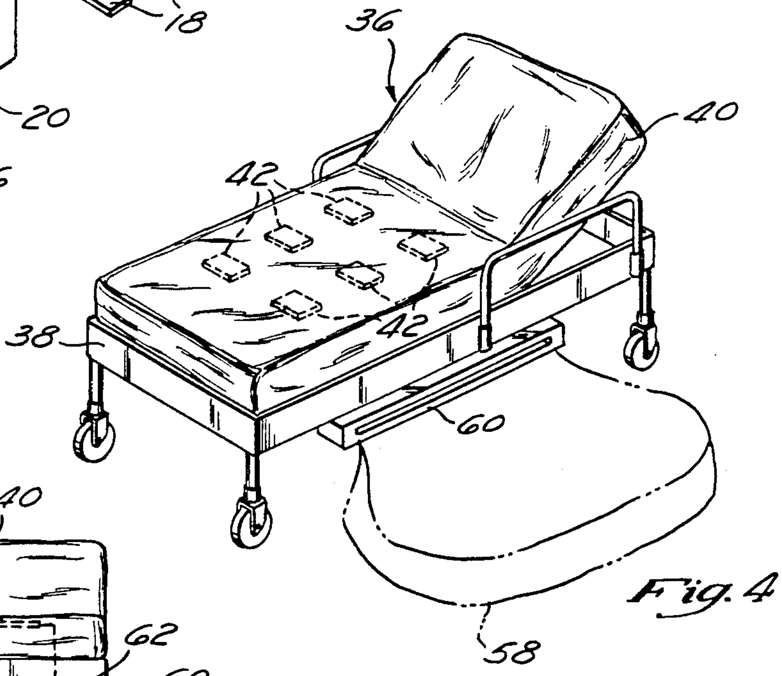
Fig. 4
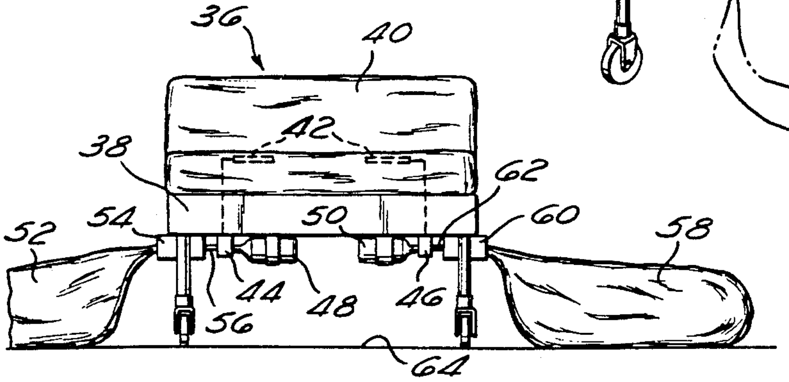
Fig. 5

IMPACT CUSHIONING DEVICE FOR BED OR WHEELCHAIR

FIELD OF THE INVENTION

The present invention relates generally to medical safety equipment, and more particularly to an impact cushioning device for protecting wheelchair, bed occupants, or the like from fall-related injuries.

BACKGROUND OF THE INVENTION

As is well known in the medical profession, patients are frequently injured from falls from wheelchairs or hospital beds. Although methods are known for forcibly restraining individuals within wheelchairs or upon beds, such retraining methods generally cannot be used for extended periods of time without causing the individual extreme discomfort and/or physical trauma.

With respect to wheelchairs, falls typically occur when the wheelchair occupant is not restrained within the wheelchair and the wheelchair encounters a sudden stop or obstruction which causes the occupant to lunge forward out of the wheelchair and onto the floor. With respect to hospital beds, falls often occur due to the bed occupant inadvertently falling off of either edge or the bottom of the bed and onto the floor. Oftentimes, such bed related falls are caused by the confusion many patients experience due to the new, unfamiliar hospital environment. Though, as previously stated, currently known wheelchairs and hospital beds include safety mechanisms, such devices attempt to restrain patient movement and are not adapted to cushion the impact of an individual falling therefrom. Thus, there exists a need in the art for an impact cushioning device attachable to wheelchairs, beds, toilets, ambulation therapy equipment and the like which is operable to prevent occupants from fall-related injuries.

SUMMARY OF THE INVENTION

In accordance with a first embodiment of the present invention, there is provided an impact cushioning device for protecting a wheelchair occupant from fall-related injuries. The device comprises an inflatable air cushion which is preferably attached to the frame portion of the wheelchair. At least one pressure sensing means is disposed on or in the seat portion of the wheelchair, the pressure sensing means being operable to generate a signal when pressure is removed therefrom. In the first embodiment, the preferred pressure sensing means comprises plural pressure sensitive switches disposed within the seat portion of the wheelchair. Also provided in the first embodiment is an inflating means for inflating the air cushion. The inflating means which is connected to the frame portion of the wheelchair is responsive to the signal generated by the sensing means. A switch means is also provided for selectively activating and deactivating the sensing means. The air cushion is preferably attached to the frame portion in a manner wherein the air cushion will inflate outwardly from the wheelchair so as to create a barrier between the wheelchair occupant and the floor when the occupant falls forward from the seat portion of the wheelchair.

The inflating means comprises a canister containing a supply of compressed gas therein, which is fluidly connected to a valve mechanism disposed between the canister and the air cushion. The valve mechanism is normally closed whereby the compressed gas is retained within the canister and operable to an open position whereby compressed gas is free to flow from the canister into the air cushion. The pressure sensing means is electrically connected to the valve mechanism and the signal generated from pressure sensing means is operable to actuate the valve mechanism from its closed position to an open position. In this respect, the signal is generated when pressure is removed from all of the four pressure sensitive switches comprising the pressure sensing means.

The valve mechanism further includes an audible or visual alarm which is electrically connected thereto. The alarm is activated when the valve mechanism actuates to an open position, thereby informing hospital personnel that the air cushion has been inflated and an occupant fall condition has occurred.

According to a second embodiment of the present invention there is provided an analogous impact cushioning device for protecting a hospital bed occupant from fall-related injuries. The cushioning device of the second embodiment may be attached to a hospital bed having a mattress portion and a frame portion. At least one inflatable air cushion is stowed relative the frame portion of the bed. Preferably a pair of inflatable air cushions are disposed on opposite sides of the bed to inflate outwardly and form a barrier between the bed occupant and the floor when the occupant falls from either side of the bed.

It is therefore an object of the present invention to provide an impact cushioning device for automatically protecting patients from injuries that occur during falls from wheelchairs or hospital beds.

Another object of the present invention is to provide an impact cushioning device which is passive in operation and thereby reduces the need for extended periods of forcible restraint of patients within wheelchairs or hospital beds.

Another object of the present invention is to provide an impact cushioning device which allows mobility for the wheelchair occupants without fear of falling.

BRIEF DESCRIPTION OF THE DRAWINGS

These as well as other features of the present invention will become more apparent upon reference to the drawings wherein:

FIG. 1 is a perspective view of a wheelchair incorporating an impact cushioning device constructed in accordance with a first embodiment of the present invention, illustrating an inflated air cushion in phantom;

FIG. 2 is a side view illustrating the manner in which a wheelchair occupant will activate and impact the inflatable air cushion of the first embodiment;

FIG. 3 is a perspective view of the components used to activate the air cushion of the first embodiment;

FIG. 4 is a perspective view of a hospital bed incorporating an impact cushioning device constructed in accordance with a second embodiment of the present invention, illustrating an inflated air cushion in phantom; and FIG. 5 is an end view of the hospital bed of the second embodiment, illustrating the first and second air cushions in a deployed state.

DETAILED DESCRIPTION OF THE PREFERRED EMBODIMENT

Referring now to the drawings wherein the showings are for purposes of illustrating preferred embodiments of the present invention only and not for purposes of limiting the same, FIG. 1 perspectively illustrates a wheelchair 10 constructed in accordance with a first embodiment of the present invention. Wheelchair 10 generally comprises a frame portion 12 having a vertical cushion 14 and a horizontal cushion 16 connected thereto.

Disposed within or positioned upon horizontal cushion 16 are plural weight sensors preferably implemented as four pressure sensitive switches 18 which are arranged in a generally square configuration. Referring now to FIG. 3, pressure sensitive switches 18 are electrically interconnected to each other and to a valve mechanism 20 in a manner whereby switches 18 are operable to generate a signal to valve mechanism 20 when pressure, i.e. weight, is removed from each of the switches 18. Fluidly connected to valve mechanism 20 is a replaceable canister 22 containing a supply of compressed gas therein. Valve mechanism 20 is also fluidly connected to an inflatable air cushion 24 (shown in phantom in FIGS. 1 and 3) by a connection line 26. The valve mechanism 20 is normally closed whereby the compressed gas is retained within canister 22 and operable to an open position whereby the compressed gas is free to flow from canister 22 into air cushion 24 by way of valve mechanism 20 and connection line 26. In this regard, the signal generated from pressure sensitive switches 18 is operable to actuate valve mechanism 20 from its closed position to an open position.

As seen in FIG. 2, when wheelchair 10 hits an obstruction 28 which causes the wheelchair occupant 30 to move forward, the removal of the occupant 30 from horizontal cushion 16 will cause the downward pressure formerly exerted by the occupant 30 onto pressure sensitive switches 18 to be removed. As previously specified, the removal of pressure from pressure sensitive switches 18 causes a signal to be generated which, due to the electrical interconnection of switches 18 to valve mechanism 20, Will cause valve mechanism 20 to actuate to an open position. When valve mechanism 20 actuates to an open position, compressed gas is released from container 22 and into air cushion 24 through connection line 26 thereby facilitating the inflation of air cushion 24. As shown in FIGS. 1–3, air cushion 24 is contained within a foot pedal 32 of frame portion 12, though it will be appreciated that air cushion 24 may be attached to other areas of frame portion 12 of wheelchair 10. In this respect, air cushion 24 need only be attached to wheelchair 10 in a manner wherein air cushion 24 will inflate outwardly from wheelchair 10 so as to create a barrier between wheelchair occupant 30 and the floor 34 in the manner shown in FIG. 2.

Though not shown, wheelchair 10 further includes an on/off switch which is movable between an on position and an off position for selectively activating and deactivating pressure sensitive switches 18. In this respect, the on/off switch is operable to block the signal from pressure sensitive switches 18 to valve mechanism 20 when the switch is in the off position. As can be appreciated, this particular feature is necessary so that when removing wheelchair occupant 30 from wheelchair 10, air cushion 24 is not unnecessarily inflated. Though also not shown, it is further contemplated that valve mechanism 20 will include an audible or visual alarm electrically connected thereto. In this regard, the alarm is activated when valve mechanism 20 actuates to an open position, thereby informing hospital personnel that the occupant 30 has fallen from the wheelchair 10.

Referring now to FIGS. 4 and 5, illustrated is a second embodiment of the present invention, wherein a hospital bed 36 is constructed to include an impact cushioning device. Hospital bed 36 generally comprises a frame portion 38 and a mattress portion 40. Disposed within or positioned upon mattress portion 40 are plural weight sensors preferably implemented as six pressure sensitive switches 42 which are arranged in a generally rectangular configuration as shown in FIG. 4. As seen in FIG. 5, pressure sensitive switches 42 are electrically connected to each other and to a first valve mechanism 44 and a second valve mechanism 46 in a manner whereby switches 42 are operable to generate a signal to first valve mechanism 44 and second valve mechanism 46 when pressure, i.e. weight, is removed from each of switches 42. Fluidly connected to first valve mechanism 44 is a replaceable first canister 48 containing a supply of compressed gas therein, while fluidly connected to second valve mechanism 46 is a replaceable second canister 50 containing a supply of compressed gas therein. First valve mechanism 44 is also fluidly connected to a first air cushion 52 stored within a first release unit 54, by a first connection line 56. Similarly, second valve mechanism 46 is fluidly connected to a second air cushion 58 stored within second release unit 60, by a second connection line 62. In the second embodiment, first valve mechanism 44 and second valve mechanism 46 are each normally closed whereby the compressed gas is retained within the respective canister and operable to an open position whereby the compressed gas is free to flow from the respective canister into the respective air cushion. In this regard, the signal generated from switches 42 is operable to actuate both first valve mechanism 44 and second valve mechanism 46 from their closed positions to open positions.

As shown in FIGS. 4 and 5, first release unit 54 and second release unit 60 are attached to frame portion 38 in a manner wherein air cushions 52, 58 will extend outwardly from the opposed longitudinal edges of bed 36 when inflated. Thus, air cushions 52, 58 serve to form barriers between the bed occupant (not shown) and the floor 64, thereby preventing injury to the bed occupant if the occupant falls off either edge of the hospital bed 36. It will be appreciated that either first air cushion 52 or second air cushion 58 may be constructed to have a generally L-shaped configuration so as to be operable to form a barrier between the bottom of hospital bed 36 and the floor 64. In this respect, either first release unit 54 or second release unit 60 would be adapted to store a cushion having such a configuration. As with the first embodiment, the hospital bed 36 further includes an on/off switch (not shown) which operates in the same manner as described with respect to the first embodiment. In this regard, the on/off switch is operable to block the signal generated from pressure sensitive switches 42 to valve mechanisms 44, 46. Additionally, the valve mechanisms 42, 44 of the second embodiment also include an audible or visual alarm electrically connected thereto which is activated when the valve mechanisms 44, 46 actuate to the open position, thereby informing medical personnel that the bed occupant has fallen. It will be appreciated that the second embodiment of the present invention may be constructed so as to have only one air cushion which extends outwardly from only one of the longitudinally extending edges of bed 36.

Though the present invention has been described as being utilized in conjunction with a wheelchair and a hospital bed, it will be appreciated that the present invention is equally usable in relation to toilets as well as ambulation therapy applications. Additionally, either embodiment of the present invention may incorporate a conventional inflation device as currently known and utilized with respect to automobiles.

Additional modifications and improvements of the present invention may also be apparent to those skilled in the art. Thus, the particular combination of parts described and illustrated herein is intended to represent only one embodiment of the invention and it is not intended to serve as limitations of alternative devices within the spirit and scope of the invention.

What is claimed is:

1. An impact cushioning device for protecting a wheelchair occupant from fall-related injuries, comprising the combination of:

- a wheelchair having a frame portion and a horizontal seat portion;
- at least one sensing means disposed in said seat portion, said sensing means being operable to generate a signal when the weight of said occupant is removed therefrom;
- an inflatable air cushion attached to said frame portion;
- means connected to said frame portion for inflating said air cushion, said inflating means being responsive to said signal generated by said sensing means; and
- a switch means for selectively activating and deactivating said sensing means;
- said air cushion being supported by said frame portion in a manner wherein said air cushion will inflate outwardly from said wheelchair so as to create a barrier between said wheelchair occupant and the floor when said occupant falls forward from said seat portion.

2. The device of claim 1 wherein said at least one sensing means comprises four pressure sensitive switches disposed within said seat portion in a generally square configuration.

3. The device of claim 2 wherein said four pressure sensitive switches are disposed within a mat positioned upon said seat portion.

4. The device of claim 2 wherein said inflating means comprises a canister containing a supply of compressed gas therein, said canister being fluidly connected to a valve mechanism and said valve mechanism being fluidly connected to said air cushion.

5. The device of claim 4 wherein said valve mechanism is normally closed whereby said compressed gas is retained within said canister and operable to an open position whereby said compressed gas is free to flow from said canister into said air cushion.

6. The device of claim 5 wherein said sensing means is electrically connected to said valve mechanism and said signal is operable to actuate said valve mechanism to said open position, said signal being generated when pressure is removed from each of said four pressure sensitive switches.

7. The device of claim 6 wherein said switch means comprises an on/off switch movable between an on position and an off position, said on/off switch being operable to block said signal from said sensing means to said valve mechanism when in said off position.

8. The device of claim 6 wherein said valve mechanism further includes an alarm electrically connected thereto, said alarm being activated when said valve mechanism actuates to said open position.

9. An impact cushioning device for protecting a hospital bed occupant from fall-related injuries, comprising the combination of:

- a bed having a mattress portion and a frame portion;
- at least one sensing means disposed in said mattress portion, said sensing means being operable to generate a signal when the weight of said occupant is removed therefrom;
- at least one inflatable air cushion attached to said frame portion;
- means connected to said frame portion for inflating said air cushion, said inflating means being responsive to said signal generated by said sensing means; and
- a switch means for selectively activating and deactivating said sensing means;
- said air cushion being supported by said frame portion in a manner wherein said air cushion will inflate outwardly from at least one longitudinally extending edge of said bed so as to create a barrier between said bed occupant and the floor when said occupant falls from said at least one longitudinally extending edge of said bed.

10. The device of claim 9 wherein said at least one sensing means comprises six pressure sensitive switches disposed within said mattress portion in a generally rectangular configuration.

11. The device of claim 10 wherein said six pressure sensitive switches are disposed within a mat positioned upon said mattress portion.

12. The device of claim 10 wherein said inflating means comprises a canister containing a supply of compressed gas therein, said canister being fluidly connected to a valve mechanism and said valve mechanism being fluidly connected to said at least one air cushion.

13. The device of claim 12 wherein said valve mechanism is normally closed whereby said compressed gas is retained within said canister and operable to an open position whereby said compressed gas is free to flow from said canister into said at least one air cushion.

14. The device of claim 13 wherein said sensing means is electrically connected to said valve mechanism and said signal is operable to actuate said valve mechanism to said open position, said signal being generated when pressure is removed from each of said six pressure sensitive switches.

15. The device of claim 14 wherein said switch means comprises an on/off switch movable between an on position and an off position, said on/off switch being operable to block said signal from said sensing means to said valve mechanism when in said off position.

16. The device of claim 14 wherein said valve mechanism further includes an alarm electrically connected thereto, said alarm being activated when said valve mechanism actuates to said open position.

17. The device of claim 10 wherein said at least one inflatable air cushion comprises a first air cushion adapted to inflate outwardly from a first longitudinally extending edge of said bed and a second air cushion adapted to inflate outwardly from a second longitudinally extending edge of said bed.

18. The device of claim 17 wherein said inflating means comprises:

- a first canister containing a supply of compressed gas therein, said first canister being fluidly connected to a first valve mechanism and said first valve mechanism being fluidly connected to said first air cushion; and a second canister containing a supply of compressed gas therein, said second canister being fluidly connected to a second valve mechanism and said second valve mechanism being fluidly connected to said second air cushion.

19. The device of claim 18 wherein said first valve mechanism is normally closed whereby said compressed gas is retained with said first canister and operable to an open position whereby said compressed gas is free to flow from said first canister into said first air cushion and said second valve mechanism is normally closed whereby said compressed gas is retained within said second canister and operable to an open position whereby said compressed gas is free to flow from said second canister into said second air cushion.

20. The device of claim 19 wherein said sensing means is electrically connected to said first valve mechanism and said second valve mechanism and said signal is operable to simultaneously actuate said first valve mechanism and said second valve mechanism to said open position, said signal being generated when pressure is removed from each of said six pressure sensitive switches.

21. The device of claim 20 wherein said switch means comprises an on/off switch movable between an on position and an off position, said on/off switch being operable to block said signal from said sensing means to said first valve mechanism and said second valve mechanism when in said off position.

22. The device of claim 20 wherein said first valve mechanism and said second valve mechanism include an alarm electrically connected thereto, said alarm being activated when said first said valve mechanism and said second valve mechanism each actuate to said open position.

* * * * *